Aug. 19, 1952  R. O. SEKKI  2,607,126
PIPE LAYOUT GAUGE
Filed June 27, 1950  2 SHEETS—SHEET 1
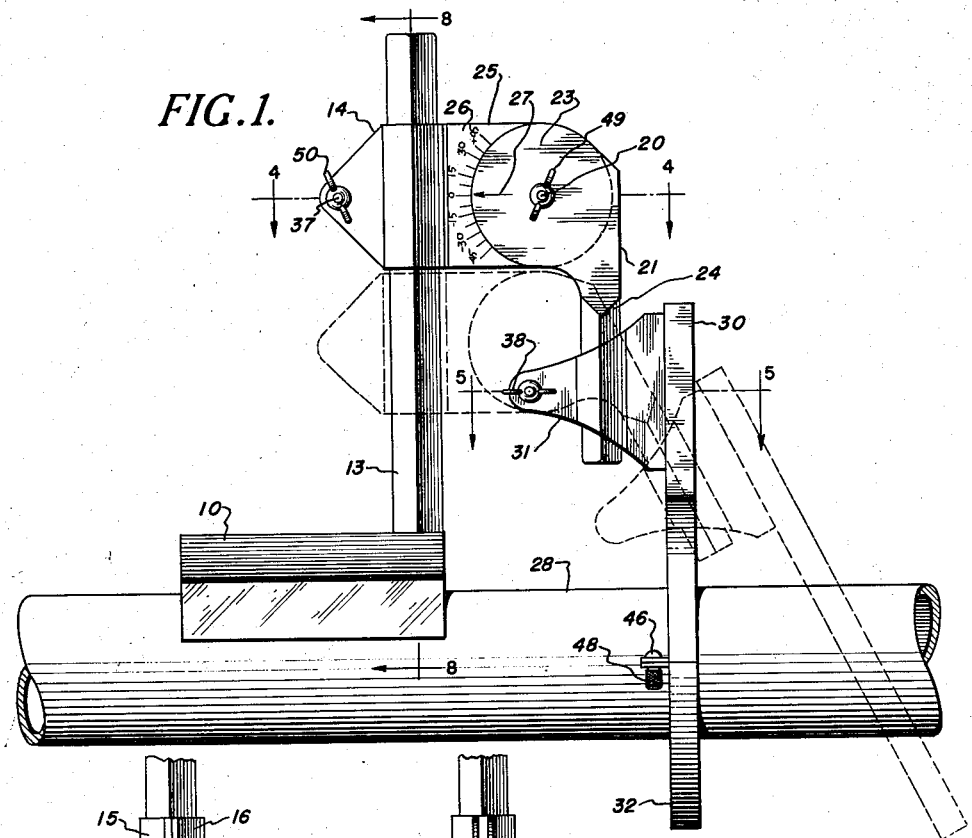
FIG.1.
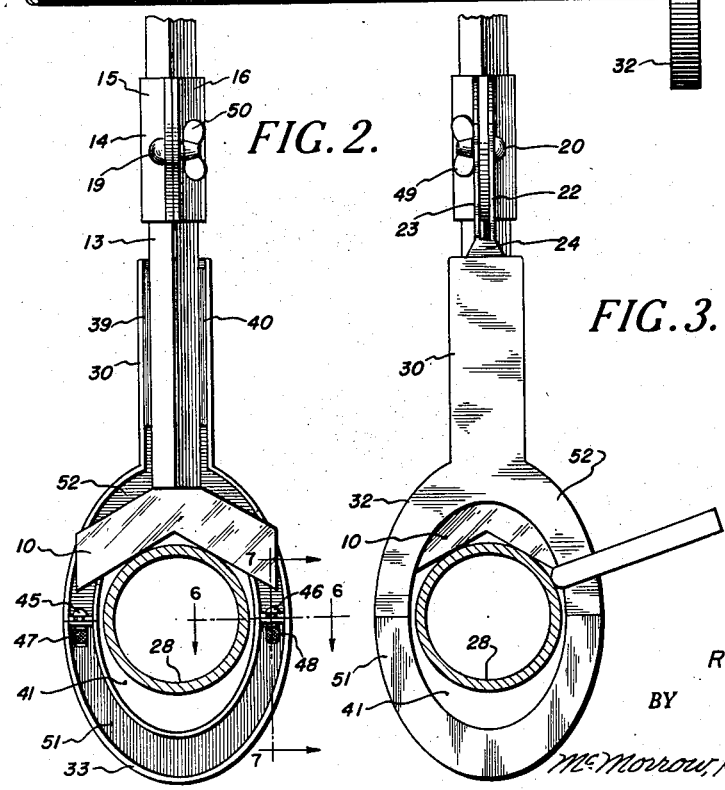
FIG.2.
FIG.3.
INVENTOR.
RUDOLPH O. SEKKI
BY
McMorrow, Berman & Davidson
ATTORNEYS Aug. 19, 1952     R. O. SEKKI     2,607,126
PIPE LAYOUT GAUGE Filed June 27, 1950     2 SHEETS—SHEET 2

INVENTOR.
RUDOLPH O. SEKKI
BY
McMorrow, Berman & Davidson
ATTORNEYS

Patented Aug. 19, 1952

2,607,126

UNITED STATES PATENT OFFICE 2,607,126

PIPE LAYOUT GAUGE

Rudolph O. Sekki, Fairport Harbor, Ohio

Application June 27, 1950, Serial No. 170,603

2 Claims. (Cl. 33—174)

This invention relates to pipe layout gauges and more particularly to a portable gauge mountable on a pipe to provide a guide for scribing a cutting line on a pipe at a predetermined angle to the longitudinal center line of the pipe.

It is among the objects of the invention to provide an improved portable gauge assembly which can be conveniently carried in a mechanic's tool box and set up for use on a pipe in situ without first disconnecting or removing the pipe, which can be set to various angles and provides a firm guide for scribing a line around the pipe so that the pipe can be cut to position its cut edge in a plane disposed at a predetermined angle to the longitudinal center line of the pipe, which is easy to adjust and to set up on a pipe and is accurate in use, which can be used on pipes of different sizes within a predetermined size range, and which is simple and durable in construction, economical to manufacture, and easy to use in a manner to obtain highly accurate results.

Other objects and advantages will become apparent from a consideration of the following description and the appended claims in conjunction with the accompanying drawings wherein:

Figure 1 is a side elevational view of a pipe scribing gauge illustrative of the invention shown in operative position on a length of pipe;

Figure 2 is an end elevational view of the gauge looking at the left-hand end of the gauge as illustrated in Figure 1;

Figure 3 is an end elevational view of the gauge looking at the right-hand end of the gauge as illustrated in Figure 1;

Figure 4:
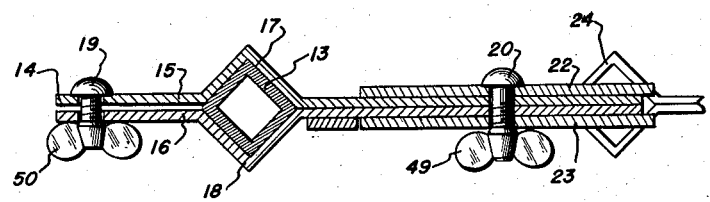
Figure 4 is a cross sectional view on the line 4—4 of Figure 1.

With continued reference to the drawings, the gauge comprises a base block 10 having on one side a concave surface 11 including two plane surfaces which intersect along the longitudinal center line of the corresponding side of the block and are disposed at an obtuse angle to each other so that the transverse cross sectional shape of this side of the block is that of a shallow, inverted V.

The opposite side of the block is convex and comprises two plane surfaces respectively parallel to the surfaces constituting the concave side of the block and a stem or lug 12 of polygonal, preferably square, cross sectional shape, projects from the convex side of the block at one end of the latter substantially perpendicular to the length of the concave surface 11.

A hollow standard 13 receives the lug or stem 12 at one end and is of a shape to closely fit the lug. This standard also extends away from the convex side of the base block substantially perpendicular to the length of the concave side of the block and a bracket 14 is slidably mounted on this standard.

The bracket 14 comprises two flat plates 15 and 16 disposed in side by side relationship and provided intermediate their length with transversely extending, outwardly projecting formations 17 and 18 which together provide a sleeve in which the standard 13 is slidably received. The two plates are provided at opposite sides of the formations 17 and 18 with registering apertures and a screw 19 extends through the registering apertures at one side of these formations, while a similar, but somewhat longer screw 20 extends through the apertures at the opposite side of the complementary formations 17 and 18. A wing nut is provided for each screw and the wing nuts are effective to clamp the bracket at various positions of adjustment along the standard 13.

A hinge member 21 is pivotally secured to the bracket 14 by the screw 20, and comprises two flat plates 22 and 23 disposed at the outer sides of the plates 15 and 16 respectively and a stem 24 of polygonal, preferably square, cross sectional shape projecting from the plates 22 and 23.

The portions of the plates 22 and 23 overlying the plates 15 and 16 of the bracket are circular in shape and the screw 20 extends through apertures provided at the centers of these circularly shaped plates. A scale plate 25 is secured to one of the bracket plates, the bracket plate 16 as illustrated, and has an arcuately curved concave edge receiving the circular portion of the plate 23. A protractor scale 26 is provided on the scale plate 25 around the arcuately shaped concave edge of the latter and a pointer 27 is provided on the plate 23 to indicate the angular relationship between the stem 24 and the standard 13.

The center line of the stem 24 is substantially tangent to the peripheries of the circular plate portions 22 and 23 and the stem extends from the bracket 14 toward the pipe section 28 upon which the gauge is mounted.

An arm 30 is provided at one end with a clamp 31 which engages the stem 24 and at its other end with a ring formation 32 which surrounds the pipe section 28.

The clamp 31 comprises two flat plates 33 and 34 disposed in side by side relationship and having intermediate their length offset and transversely extending formations 35 and 36 respectively which together provide a sleeve slidably receiving the stem 24. At one side of the sleeve provided by the formations 35 and 36 the two plates are provided with registering apertures and a screw 37 extends through these apertures and is provided with a wing nut 38 for clamping the clip in adjusted position on the stem 24. At the side of the sleeve provided by the formations 35 and 36 opposite the screw 37 the plates are provided with outwardly extended portions 39 and 40 respectively which extend transversely of and substantially perpendicular to the plate and in a direction away from each other.

Figure 5:
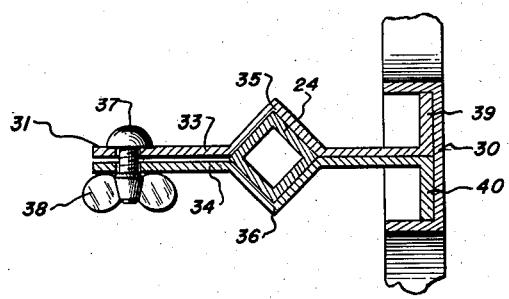
Figure 5 is a cross sectional view on the line 5—5 of Figure 1.

The arm 30 is of channel shaped cross section and the clip adjacent end of this arm receives the plate portions 39 and 40 in the interior thereof, as is particularly illustrated in Figure 5. The arm is secured to the portions 39 and 40 of the clamp plates by suitable means such as welding brazing, rivets or screws.

The ring formation 32 is also of channel shaped cross section and includes an elongated or elliptical opening 41 for receiving the pipe section to be marked.

Figure 6:
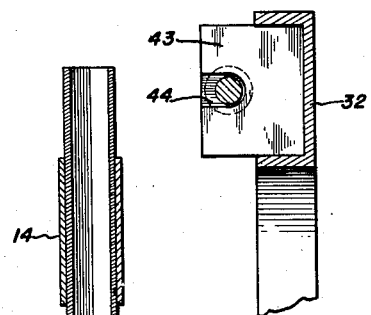
Figure 6 is a cross sectional view on the line 6—6 of Figure 2.
Figure 7:
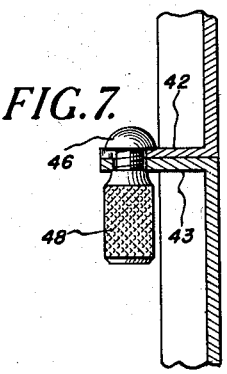
Figure 7 is a cross sectional view on the line 7—7 of Figure 2.
Figure 8:
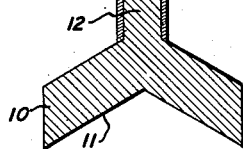
Figure 8 is a cross sectional view on the line 8—8 of Figure 1.

This ring formation is divided into two parts along the minor axis of the elliptical opening 41 and the two parts are provided at their ends with outwardly projecting lugs, as indicated at 42 and 43 in Figures 6 and 7, which extend perpendicularly from the side of the web portions of the channel shaped ring members at the inner or concave sides of these members and are superimposed at the respectively opposite sides of the ring formations. The lugs at the ends of the portion of the ring formation which is integral with the arm 30 are provided with apertures and the lugs at the ends of the separable portion of the ring formation are provided with notches, as indicated at 44 in Figure 6. Screws 45 and 46 extend through the lugs on the two portions of the ring formation and are provided with nuts 47 and 48 respectively to secure the two portions of the ring formation together.

In using the device, the wing nut 49 on the screw 20 is loosened and the hinge member is adjusted relative to the bracket 14 until the pointer 27 is opposite the proper indication on the protractor scale 26 to give the desired cutting angle on the pipe section to be cut. With the wing nut 50 on the screw 37 loosened and the separable portion 51 of the ring formation 32 removed from the integral portion 52 of the ring formation, the base block 10 is set on the pipe section with its concave side in firm contact with the pipe section. The pipe section will be partly received in the integral portion 52 of the ring formation and the separable portion 51 of the ring formation is now connected to the integral portion 52 so that the pipe is entirely surrounded by the ring formation. The bracket 14 is then adjusted along the standard 13 until the pipe is centered in the opening 41 of the ring formation, whereupon the wing nut 50 is tightened to secure the bracket in properly adjusted position.

A suitable marking instrument, such as a piece of chalk, may now be moved around the smooth side of the ring formation 32 remote from the base block 10 to provide a mark around the pipe which mark can be used for cutting the pipe so that the cut edge of the pipe will be in a plane disposed at the predetermined angle to the longitudinal center line of the pipe for which the gauge was set by the protractor scale 26.

The notches 44 in the lugs of the separable portion of the ring formation permit this portion to be removed from the integral portion of the ring formation without removing the screws 45 and 46 or the nuts 47 and 48, and are so shaped as to render the marking side of the ring formations smooth and continuous when the two parts of the ring formation are secured together.

The slidable connection between the stem 24 and the clamp 31 provides a secondary adjustment for the gauge which is particularly useful when the arm 30 is set at a large angle to the standard 13, in centering the ring formation relative to the associated pipe section and the square shape of the standard 13 and stem 24 together with the complementary square shapes of the stem receiving portions of the bracket 14 and clamp 31 provide an instrument of high accuracy in which the parts are rigidly held in properly adjusted position relative to each other.

The gauge may be made in different sizes or different size arms and ring formations may be provided for pipes in different size ranges, but the instrument is so designed that each ring formation will accommodate a pipe size range of at least one inch in diameter.

The invention may be embodied in other specific forms without departing from the spirit or essential characteristics thereof. The present embodiment is, therefore, to be considered in all respects as illustrative and not restrictive, the scope of the invention being indicated by the appended claims rather than by the foregoing description, and all changes which come within the meaning and range of equivalency of the claims are, therefore, intended to be embraced therein.

What is claimed is:

1. A pipe layout gauge comprising a base block having on one side a concave surface for setting the base block on a pipe to be marked, a standard of polygonal cross sectional shape projecting from the side of said block opposite said concave side and disposed substantially perpendicular to the length of the latter, a bracket slidably mounted on said standard and having a protractor scale thereon, an arm pivotally connected at one end to said bracket and having thereon a pointer cooperating with said scale, a pipe surrounding ring formation adjacent the other end of said arm to provide a scribing guide, means connecting said ring formation to said arm for movement of adjustment of the former longitudinally of the latter, said ring formation having therein an opening of elliptical shape and being divided into two separable parts along the minor axis of the elliptical opening, and means carried by one of said parts and engaging the other part detachably connecting said parts together.

2. A pipe layout gauge comprising a base block having a concave surface for setting the block on a pipe section to be marked, a standard projecting from the side of said block opposite said concave surface and disposed substantially perpendicular to said block, a bracket slidably mounted on said standard, a hinge member pivotally connected to said bracket and including a stem, means providing an angular indication between said bracket and said hinge member, a clamp slidably mounted on said stem, an arm secured at one end to said clamp, a two part ring formation on said arm at the other end thereof and adapted to surround a pipe section on which said base block is mounted, and screw means extending through said bracket and said clamp for locking said bracket and said clamp in adjusted position on said standard and said stem respectively.

RUDOLPH O. SEKKI.

REFERENCES CITED

The following references are of record in the file of this patent:

UNITED STATES PATENTS

| Number | Name | Date |
|---|---|---|
| 1,698,154 | Day | June 8, 1929 |
| 1,852,412 | Hickey | Apr. 5, 1932 |
| 1,922,529 | Day | Aug. 15, 1933 |
| 2,326,447 | Enderson | Aug. 10, 1943 |
| 2,337,957 | Akins | Dec. 28, 1943 |
| 2,466,464 | Moore | Apr. 5, 1949 |
| 2,509,698 | Rudisell | May 30, 1950 |